United States Patent
Adachi et al.

(10) Patent No.: US 10,280,232 B2
(45) Date of Patent: May 7, 2019

(54) MODIFIED CONJUGATED DIENE POLYMER, METHOD FOR PRODUCING MODIFIED CONJUGATED DIENE POLYMER, POLYMER COMPOSITION, CROSSLINKED POLYMER, AND TIRE

(71) Applicant: JSR CORPORATION, Minato-ku (JP)

(72) Inventors: Takumi Adachi, Minato-ku (JP);
Koichiro Tani, Minato-ku (JP);
Hiroyuki Morita, Minato-ku (JP);
Ryoji Tanaka, Minato-ku (JP)

(73) Assignee: JSR CORPORATION, Minato-ku (JP)

( * ) Notice: Subject to any disclaimer, the term of this patent is extended or adjusted under 35 U.S.C. 154(b) by 0 days.

(21) Appl. No.: 15/556,914

(22) PCT Filed: Jan. 29, 2016

(86) PCT No.: PCT/JP2016/052778
§ 371 (c)(1),
(2) Date: Sep. 8, 2017

(87) PCT Pub. No.: WO2016/143407
PCT Pub. Date: Sep. 15, 2016

(65) Prior Publication Data
US 2018/0051101 A1    Feb. 22, 2018

(30) Foreign Application Priority Data

Mar. 10, 2015  (JP) ................. 2015-047624

(51) Int. Cl.
| | |
|---|---|
| C08F 8/32 | (2006.01) |
| C08C 19/25 | (2006.01) |
| C08F 36/04 | (2006.01) |
| C08C 19/22 | (2006.01) |
| B60C 1/00 | (2006.01) |
| C08K 3/36 | (2006.01) |
| C08L 15/00 | (2006.01) |
| C08J 3/24 | (2006.01) |

(52) U.S. Cl.
CPC ............... C08C 19/25 (2013.01); B60C 1/00 (2013.01); B60C 1/0016 (2013.01); C08C 19/22 (2013.01); C08F 8/32 (2013.01); C08F 36/04 (2013.01); C08J 3/24 (2013.01); C08K 3/36 (2013.01); C08L 15/00 (2013.01)

(58) Field of Classification Search
CPC . C08C 19/25; C08F 8/32; C08F 36/04; C08L 15/00; C08J 3/24; C08J 3/36
USPC ...................................................... 524/572
See application file for complete search history.

(56) References Cited

U.S. PATENT DOCUMENTS

| | | | |
|---|---|---|---|
| 7,342,070 B2 | 3/2008 | Tsukimawashi et al. | |
| 9,951,167 B2* | 4/2018 | Kawai ..................... | C08C 19/00 |
| 2004/0254301 A1 | 12/2004 | Tsukimawashi et al. | |
| 2012/0172528 A1* | 7/2012 | Cheng ..................... | C08C 19/44 |
| | | | 525/105 |
| 2012/0296041 A1 | 11/2012 | Luo | |
| 2013/0267646 A1* | 10/2013 | Kameda ..................... | C08L 9/06 |
| | | | 524/526 |
| 2013/0296481 A1* | 11/2013 | Tanaka ..................... | B60C 1/00 |
| | | | 524/575 |
| 2015/0018488 A1 | 1/2015 | Luo et al. | |
| 2015/0148489 A1 | 5/2015 | Luo et al. | |
| 2018/0223008 A1* | 8/2018 | Inoue ..................... | B60C 1/00 |

(Continued)

FOREIGN PATENT DOCUMENTS

| | | |
|---|---|---|
| CN | 103848940 | 6/2014 |
| JP | 2006-249069 A | 9/2006 |
| JP | 4129619 B2 | 8/2008 |

(Continued)

OTHER PUBLICATIONS

English Translation of JP 2011-162497 (Year: 2011).*
Extended European Search Report dated Mar. 8, 2018 in European Patent Application No. 16761379.3.
International Search Report dated Apr. 12, 2016 in PCT/JP2016/052778 filed Jan. 29, 2016.
Examination Report dated Jan. 14, 2019, in European Patent Application No. 16761379.3, filed Jan. 29, 2016.
Office Action dated Mar. 4, 2019, in Chinese Patent Application No. 201680007879.X (with English machine translation).

*Primary Examiner* — Hannah J Pak
(74) *Attorney, Agent, or Firm* — Oblon, McClelland, Maier & Neustadt, L.L.P.

(57) ABSTRACT

A modified conjugated diene-based polymer is produced by reacting a conjugated diene-based polymer having an alkali metal or an alkali-earth metal at a terminal of the polymer with a compound represented by formula (1). $R^1$ and $R^2$ independently represent a hydrocarbyl group having 20 or fewer carbon atoms. $R^3$ represents a substituted alkyl group having 20 or fewer carbon atoms prepared through substitution of at least one of a hydrogen atom and $-CH_2-$ of an alkyl group by a group containing only at least one heteroatom selected from the group consisting of nitrogen, phosphorus, oxygen, and sulfur, or a monovalent aromatic group having 20 or fewer carbon atoms and containing at least one element selected from the group consisting of nitrogen, phosphorus, oxygen, and sulfur, with the proviso that $R^3$ does not have active hydrogen. $R^4$ represents an alkanediyl group having 20 or fewer carbon atoms. n is 1 or 2.

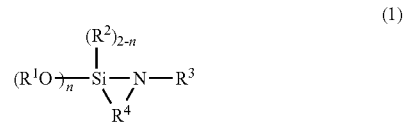

(1)

7 Claims, No Drawings

(56) References Cited

U.S. PATENT DOCUMENTS

2018/0251576 A1* 9/2018 Adachi ................ B60C 1/0016

FOREIGN PATENT DOCUMENTS

| JP | 2011-162497 | | 8/2011 |
| JP | 2013-43977 | A | 3/2013 |
| JP | 2014-528988 | A | 10/2014 |
| JP | 2015-28170 | A | 2/2015 |
| WO | WO 2006/076629 | A1 | 7/2006 |

* cited by examiner

MODIFIED CONJUGATED DIENE POLYMER, METHOD FOR PRODUCING MODIFIED CONJUGATED DIENE POLYMER, POLYMER COMPOSITION, CROSSLINKED POLYMER, AND TIRE

TECHNICAL FIELD

The present invention relates to a modified conjugated diene-based polymer, a method for producing a modified conjugated diene-based polymer, a polymer composition, a crosslinked polymer, and a tire.

BACKGROUND ART

Known rubber materials for automotive tires include a conjugated diene-based rubber (e.g., a styrene-butadiene copolymer) prepared through an emulsion polymerization process or a solution polymerization process. Demanded rubber materials for tires include a conjugated diene-based rubber capable of producing a tire that exhibits low rolling resistance and is excellent in terms of various properties, including wear resistance, fracture properties, and steering stability. In connection therewith, a variety of techniques have been proposed for modifying conjugated diene-based rubbers used for tires (refer to, for example, Patent Documents 1 to 3).

Patent Document 1 discloses a method for producing a conjugated diene-based polymer having a primary amino group and an alkoxysilyl group at a terminal of the polymer by reacting a conjugated diene-based polymer having a polymerization active terminal with a modifying agent (i.e., an alkoxysilane compound having a nitrogen-containing group prepared through protection of active hydrogen of an amino group with a silyl group), followed by hydrolysis. Patent Document 2 discloses a method for modifying a conjugated diene-based polymer by use of N-n-butyl-aza-2,2-dialkoxysilacyclopentane. Patent Document 3 discloses a method for producing a modified conjugated diene-based polymer through a step of reacting the active terminal of a conjugated diene-based polymer having a molecular weight distribution within a specific range with a modifying agent containing four or more alkoxy groups bonded to a silyl group and one or more nitrogen atoms, and a step of reacting the active terminal with a modifying agent containing two or three alkoxy groups bonded to a silyl group and one or more nitrogen atoms.

PRIOR ART DOCUMENTS

Patent Documents

Patent Document 1: Japanese Patent No. 4129619
Patent Document 2: International Patent Publication WO 2006/076629
Patent Document 3: Japanese Patent Application Laid-Open (kokai) No. 2013-43977

SUMMARY OF THE INVENTION

Problems to be Solved by the Invention

When a modified conjugated diene-based polymer is produced by the method disclosed in Patent Document 1, the polymerization solvent may contain a silanol compound generated during the production process, and thus the recycling of the solvent may require a treatment for reducing the effects of the silanol compound (e.g., removal or detoxification of the compound). In view of, for example, recent environmental circumstances (e.g., global warming due to carbon dioxide emission), increasing awareness about resource saving and energy saving, and economic situations (e.g., an increase in the price of gasoline), rubber materials for tires have been required to achieve compatibility between low hysteresis loss properties (i.e., an index for evaluation of low fuel consumption performance) and wet grip properties (i.e., an index for evaluation of steering stability).

In view of the foregoing, an object of the present invention is to provide a modified conjugated diene-based polymer that can reduce the generation of a silanol compound, and can produce a rubber material exhibiting a good balance between low hysteresis loss properties and wet grip properties.

Means for Solving the Problems

The present inventors have conducted extensive studies for solving the aforementioned problems involved in the conventional techniques, and as a result have found that the problems can be solved by a polymer having a specific functional group. The present invention has been accomplished on the basis of this finding. Specifically, the present invention provides a modified conjugated diene-based polymer, a method for producing the polymer, a polymer composition, a crosslinked polymer, and a tire, which are described below.

According to one aspect of the present invention, there is provided a modified conjugated diene-based polymer produced by reacting a conjugated diene-based polymer having an alkali metal or an alkaline-earth metal at a terminal of the polymer with a compound represented by the following formula (1):

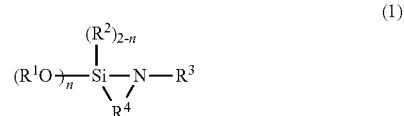

(where $R^1$ and $R^2$ each independently represent a hydrocarbyl group having 20 or fewer carbon atoms; $R^3$ represents a substituted alkyl group having 20 or fewer carbon atoms prepared through substitution of at least one of a hydrogen atom and —$CH_2$— of an alkyl group by a group containing only at least one heteroatom selected from the group consisting of nitrogen, phosphorus, oxygen, and sulfur, or a monovalent aromatic group having 20 or fewer carbon atoms and containing at least one element selected from the group consisting of nitrogen, phosphorus, oxygen, and sulfur, with the proviso that $R^3$ does not have active hydrogen; $R^4$ represents an alkanediyl group having 20 or fewer carbon atoms; and n is 1 or 2).

According to another aspect of the present invention, there is provided a method for producing a modified conjugated diene-based polymer, the method comprising reacting a conjugated diene-based polymer having an alkali metal or an alkaline-earth metal at a terminal of the polymer with a compound represented by the aforementioned formula (1).

According to another aspect of the present invention, there is provided a polymer composition comprising the aforementioned modified conjugated diene-based polymer, silica, and a crosslinking agent. Also, a crosslinked polymer produced through crosslinking of the polymer composition is provided. Also, a tire obtained by employing the crosslinked polymer as a tread material, a sidewall material or both is provided.

Advantageous Effects of the Invention

The modified conjugated diene-based polymer whose terminal is modified by the compound represented by the aforementioned formula (1) can reduce the generation of a silanol compound during the production of the polymer. The aforementioned modified conjugated diene-based polymer can produce a vulcanized rubber exhibiting a good balance between low hysteresis loss properties and wet grip properties required for an automotive tire and similar applications. The use of the modified conjugated diene-based polymer can produce an automotive tire exhibiting the compatibility between low fuel consumption performance and wet grip properties.

MODES FOR CARRYING OUT THE INVENTION

[1] Modified Conjugated Diene-based Polymer

A modified conjugated diene-based polymer according to one embodiment of the invention may be produced by reacting a conjugated diene-based polymer having an alkali metal or an alkaline-earth metal at a terminal of the polymer with a specific cyclic silazane compound (A).

<Conjugated Diene-based Polymer>

The conjugated diene-based polymer may be produced by polymerizing a conjugated diene compound, or polymerizing a conjugated diene compound and an aromatic vinyl compound, in the presence of an alkali metal compound or an alkaline-earth metal compound. Examples of the conjugated diene compound used in the polymerization step include 1,3-butadiene, isoprene, 2,3-dimethyl-1,3-butadiene, 1,3-pentadiene, 1,3-hexadiene, 1,3-heptadiene, 2-phenyl-1,3-butadiene, 3-methyl-1,3-pentadiene, 2-chloro-1,3-butadiene, and the like. Among these, 1,3-butadiene, isoprene, 2,3-dimethyl-1,3-butadiene, and the like may preferably be used. Note that these conjugated diene compounds may be used either alone or in combination.

Examples of the aromatic vinyl compound used in the polymerization step include styrene, 2-methylstyrene, 3-methylstyrene, 4-methylstyrene, α-methylstyrene, 2,4-dimethylstyrene, 2,4-diisopropylstyrene, 4-t-butylstyrene, 5-t-butyl-2-methylstyrene, vinylethylbenzene, divinylbenzene, trivinylbenzene, divinylnaphthalene, t-butoxystyrene, vinylbenzyldimethylamine, (4-vinylbenzyl) dimethylaminoethyl ether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinylpyridine, diphenylethylene, a tertiary amino group-containing diphenylethylene (e.g., 1-(4-N,N-dimethylaminophenyl)-1-phenylethylene and the like), and the like. Among these, styrene is particularly preferable. Note that these aromatic vinyl compounds may be used either alone or in combination.

The conjugated diene-based polymer obtained by the polymerization step may be a homopolymer of the conjugated diene compound, but is preferably a copolymer of the conjugated diene compound and the aromatic vinyl compound from the viewpoint of improving the strength of the resulting rubber. In particular, it is preferable that the conjugated diene-based polymer be a copolymer of 1,3-butadiene and styrene since high living properties are achieved during anionic polymerization. The copolymer may be either a random copolymer or a block copolymer.

Now will be described the amounts of the conjugated diene compound and aromatic vinyl compound used in the present invention. The amount of the conjugated diene compound used is preferably 50 to 100 mass %, more preferably 55 to 95 mass %, relative to the total amount of monomers used for synthesis of the conjugated diene-based polymer, from the viewpoint of a good balance between the low hysteresis loss properties, wet skid resistance, and wear resistance of the crosslinked polymer produced through crosslinking of the modified conjugated diene-based polymer. The amount of the aromatic vinyl compound used is preferably 0 to 50 mass %, more preferably 5 to 45 mass %, relative to the total amount of monomers used for synthesis of the conjugated diene-based polymer.

An additional monomer other than the conjugated diene compound and the aromatic vinyl compound may also be used for polymerization. Examples of the additional monomer include acrylonitrile, methyl (meth)acrylate, ethyl (meth)acrylate, hydroxyethyl (meth)acrylate, and the like. The additional monomer is preferably used in a ratio of 25 mass % or less, more preferably 15 mass % or less, and still more preferably 10 mass % or less, based on the total amount of the monomers used for polymerization.

When the conjugated diene-based polymer is produced using a monomer, the monomer may be polymerized using a solution polymerization method, a vapor-phase polymerization method, or a bulk polymerization method. Among these, a solution polymerization method is particularly preferable. The monomer may be polymerized in a batch-wise manner or a continuous manner. When using the solution polymerization method, the monomer that includes the conjugated diene compound may be polymerized in an organic solvent in the presence of the alkali metal or the alkaline-earth metal (serving an initiator) and a vinyl content modifier (a randomizer), for example.

Examples of the alkali metal compound or the alkaline-earth metal compound include mono lithium compounds such as methyllithium, ethyllithium, n-propyllithium, n-butyllithium, sec-butyllithium, tert-butyllithium, phenyllithium, stilbenelithium and naphthyllithium; multifunctional lithium compounds such as 1,4-dilithiobutane, 1,4-dilithio-2-ethylcyclohexane, sec-butyllithium/1,3-diisopropenylbenzene diadduct, 1,3,5-trilithiobenzene; naphthylsodium, naphthylpotassium, di-n-butylmagnesium, di-n-hexylmagnesium, ethoxypotassium, calcium stearate, and the like. Among these, alkali metal compounds are preferably used, and lithium compounds are particularly preferably used.

The polymerization reaction may be effected in the presence of a compound that is obtained by mixing the alkali metal compound or the alkaline-earth metal compound with a compound that includes a functional group that interacts with silica. The conjugated diene-based polymer having a functional group that interacts with silica in the polymerization-initiation terminal can be obtained by effecting polymerization in the presence of the compound. Note that the term "interaction" used herein means that a covalent bond is formed between molecules, or an intermolecular force (intermolecular electromagnetic force such as ion-dipole interaction, dipole-dipole interaction, a hydrogen bond, or van der Waals force) that is weaker than a covalent bond is formed. The functional group that interacts with silica may be used a group that includes at least one element selected from the group consisting of nitrogen, phosphorus, oxygen, silicon and sulfur.

The compound that is obtained by mixing the alkali metal compound or the alkaline-earth metal compound with the compound that includes a functional group that interacts with silica is preferably a reaction product (a metal amide compound) of a lithium compound (e.g., alkyllithium) and a nitrogen-containing compound (e.g., a secondary amine compound). Specific examples of the nitrogen-containing compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine, 1,3-ditrimethylsilyl-1,3,5-triazinane, and the like.

In the case of polymerization in the presence of the metal amide compound, the amount of the secondary amine compound used relative to that of the alkali metal compound or the alkaline-earth metal compound can be appropriately determined depending on the type of the alkali metal compound or alkaline-earth metal compound used. In general, the amount of the secondary amine compound can be adjusted to fall within a range of 0.1 to 1.8 mol relative to 1 mol of the metal atom of the alkali metal compound or alkaline-earth metal compound used for the polymerization. The amount of the secondary amine compound is preferably 0.2 to 1.5 mol, more preferably 0.3 to 1.0, for further improvements in wet grip properties and low hysteresis loss properties.

In the case of polymerization in the presence of a polymerization initiator having a functional group, a compound prepared through mixing of the alkali metal compound or the alkaline-earth metal compound with a compound having a functional group that interacts with silica may be added to the polymerization system. Alternatively, the alkali metal compound or the alkaline earth metal compound and the compound having a functional group that interacts with silica may be separately added to the polymerization system, and these compounds may be mixed with each other in the polymerization system.

In the aforementioned polymerization reaction, the total amount of the polymerization initiator(s) used is preferably 0.2 to 20 mmol relative to 100 g of the monomer used for the polymerization. The aforementioned polymerization initiators may be used singly or in combination of two or more species.

The randomizer may be used to adjust the content (vinyl bond content) of vinyl bonds (1,2-bond and 3,4-bond), for example. Examples of the randomizer include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, tetramethylethylenediamine, and the like. These compounds may be used either alone or in combination.

The organic solvent used for polymerization may be an organic solvent that is inert to the reaction. Examples of the organic solvent used for polymerization include aliphatic hydrocarbons, alicyclic hydrocarbons, aromatic hydrocarbons, and the like. It is preferable to use a hydrocarbon having 3 to 8 carbon atoms. Specific examples of the hydrocarbon having 3 to 8 carbon atoms include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, cyclohexene, and the like. These organic solvents may be used either alone or in combination.

When using the solution polymerization method, the monomer concentration in the reaction solvent is preferably 5 to 50 mass %, and more preferably 10 to 30 mass %, from the viewpoint of maintaining the balance between productivity and polymerization controllability. The polymerization reaction temperature is preferably −20 to 150° C., more preferably 0 to 120° C., and still more preferably 20 to 100° C. It is preferable to effect the polymerization reaction under a pressure sufficient to substantially maintain the monomer to be in a liquid phase. Such a pressure may be achieved by pressurizing the reactor using gas that is inert to the polymerization reaction, for example.

The aforementioned polymerization reaction can produce a conjugated diene-based polymer having an alkali metal or an alkaline-earth metal at the polymerization-end terminal. The conjugated diene-based polymer preferably has a weight average molecular weight (Mw) (in terms of polystyrene) of $1.0 \times 10^5$ to $2.0 \times 10^6$ as measured by means of gel permeation chromatography (GPC). An Mw of less than $1.0 \times 10^5$ may lead to deterioration of low heat generation property and wear resistance of the crosslinked polymer produced through crosslinking of the modified conjugated diene-based polymer, whereas an Mw exceeding $2.0 \times 10^6$ may lead to poor processability of the polymer composition containing the modified conjugated diene-based polymer. The Mw is more preferably $1.2 \times 10^5$ to $1.5 \times 10^6$, still more preferably $1.5 \times 10^5$ to $1.0 \times 10^6$.

In the resultant conjugated diene-based polymer, the amount of the structural unit derived from the aromatic vinyl compound is preferably 0 to 50 mass % relative to the total amount of the structural units of the conjugated diene-based polymer, and the vinyl bond content is preferably 20 to 90 mol % relative to the total amount of the structural units derived from the conjugated diene compound in the conjugated diene-based polymer, from the viewpoint of a good balance between the low hysteresis loss properties and wet grip properties of the crosslinked polymer. The amount of the monomer units derived from the aromatic vinyl compound is more preferably 5 to 45 mass %, still more preferably 10 to 40 mass %. The vinyl bond content of the structural unit derived from the conjugated diene compound is more preferably 25 to 85 mol %, still more preferably 30 to 70 mol %, from the viewpoint of the compatibility between grip properties and wear resistance. The vinyl bond content is measured by means of $^1$H-NMR.

<Cyclic Silazane Compound (A)>

The cyclic silazane compound (A) used in the present invention is represented by the aforementioned formula (1). In the formula (1), the hydrocarbyl group represented by $R^1$ or $R^2$ is, for example, a C1 to C20 linear or branched alkyl group, a C3 to C20 cycloalkyl group, a C6 to C20 aryl group, or a C7 to C20 aralkyl group. In particular, an alkyl group or an aryl group is preferred, and a methyl group or an ethyl group is more preferred.

The "group containing only at least one heteroatom selected from the group consisting of nitrogen, phosphorus, oxygen, and sulfur" (hereinafter may be referred to as "specific group") of $R^3$ may be any group having neither active hydrogen nor a heteroatom other than nitrogen, phosphorus, oxygen, and sulfur. Specific examples of the specific group include —$NR^5R^6$, —$PR^5R^6$, —O—, —S—, —S—S—, —$NR^5$—, and —$PR^5$— (note: $R^5$ and $R^6$ each represent a hydrocarbyl group having 10 or fewer carbon atoms). No particular limitation is imposed on the number of specific groups possessed by the substituted alkyl group of $R^3$, and the substituted alkyl group may have one or more specific groups. In particular, the specific group is preferably a group containing at least nitrogen, in view of a large improvement in the dispersibility of silica. The specific group is more preferably at least one of —$NR^5R^6$ and —$NR^5$—. The substituted alkyl group may have a linear or branched alkyl chain. As used herein, the term "heteroatom" refers to an atom other than carbon and hydrogen. As used herein, the term "active hydrogen" refers to a hydrogen atom bonded to an atom other than carbon, preferably a hydrogen atom having a binding energy lower than that of a carbon-hydrogen bond of polymethylene.

The monovalent aromatic group represented by $R^3$ may be any monovalent aromatic group having no active hydrogen. Examples of the monovalent aromatic group include a group prepared through removal of one hydrogen atom from the ring moiety of a heterocyclic aromatic compound containing at least one element selected from the group consisting of nitrogen, phosphorus, oxygen, and sulfur; and a group prepared through removal of one hydrogen atom from the ring moiety of a cyclic compound obtained by substitution of the aforementioned specific group for at least one hydrogen atom of an aromatic ring (including an aromatic hydrocarbon and a heterocyclic aromatic compound). Examples of the heterocyclic aromatic compound include pyridine, pyrimidine, pyrazine, thiophene, and furan. Examples of the aromatic hydrocarbon include benzene ring, naphthalene ring, and anthracene ring.

The alkanediyl group represented by $R^4$ is preferably a C2 to C7 alkanediyl group, more preferably a C3 to C5 alkanediyl group. In the formula (1), n is preferably 2 from the viewpoints of the interaction with silica and the processability of the resultant polymer composition.

The cyclic silazane compound (A) is preferably a compound wherein $R^3$ is a substituted alkyl group. Specific examples of the compound include 2-(2,2-dimethoxy-1,2-azasilolidin-1-yl)-N,N-diethylethan-1-amine, 2-(2,2-dimethoxy-1,2-azasilolidin-1-yl)-N,N-dimethylethan-1-amine, 3-(2,2-dimethoxy-1,2-azasilolidin-1-yl)-N,N-diethylpropan-1-amine, and 2-(2,2-dimethoxy-1-aza-2-silacyclohexan-1-yl)-N,N-diethylethan-1-amine. Cyclic silazane compounds (A) may be used singly or in combination of two or more species.

The reaction between the conjugated diene-based polymer and the cyclic silazane compound (A) (hereinafter the reaction may be referred to as "terminal modification reaction") may be, for example, a solution reaction. The solution reaction may be performed by use of a solution containing unreacted monomer after completion of the polymerization reaction. Alternatively, the solution reaction may be performed through isolation of the conjugated diene-based polymer contained in the solution, and dissolution of the isolated polymer in an appropriate solvent (e.g., cyclohexane). This reaction may be performed by a batch or continuous process. No particular limitation is imposed on the method of adding the cyclic silazane compound (A). For example, the cyclic silazane compound (A) may be added at one time or in a divided or continuous manner.

The amount of the cyclic silazane compound (A) used (or the total amount of two or more cyclic silazane compounds (A) used) is preferably 0.2 mol or more, more preferably 0.4 mol or more, relative to 1 mol of the metal atom (responsible for the polymerization reaction) of the polymerization initiator. An amount of 0.2 mol or more can lead to sufficient progress of the terminal modification reaction, resulting in large improvements in low fuel consumption performance and wet grip performance. In order to reduce the amount of unreacted compound in the solution after the reaction, the cyclic silazane compound (A) is used in an amount of preferably less than 1.2 mol, more preferably less than 1.0 mol, relative to 1 mol of the metal atom (responsible for the polymerization reaction) of the polymerization initiator.

The terminal modification reaction temperature is generally equal to the polymerization reaction temperature, and is preferably −20 to 150° C., more preferably 0 to 120° C., particularly preferably 20 to 100° C. A low modification reaction temperature may lead to an increase in the viscosity of the conjugated diene-based polymer, whereas a high modification reaction temperature facilitates the inactivation of the polymerization active terminal. The terminal modification reaction time is preferably one minute to five hours, more preferably two minutes to one hour.

For the terminal modification reaction, the cyclic silazane compound (A) may be used in combination with an additional compound that can react with the polymerization active terminal. No particular limitation is imposed on the additional compound, so long as it reacts with the polymerization active terminal and has no active hydrogen. The additional compound may be appropriately selected from among conventionally known compounds. Specific examples of the additional compound that reacts with the polymerization active terminal include modifying agents and coupling agents, such as alkoxysilane compounds containing an amino group, compounds containing a glycidylamino group, (thio)carbonyl compounds containing an amino group, tin compounds, silicon compounds, and isocyanate compounds. If the additional compound is used for the terminal modification reaction, the amount of the additional compound is preferably 20 mol % or less, more preferably 10 mol % or less, relative to the total amount of the cyclic silazane compound (A) and the additional compound.

The modified conjugated diene-based polymer contained in the reaction solution can be isolated by, for example, a known solvent removal method (e.g., steam stripping) and a drying operation (e.g., thermal treatment). The Mooney viscosity of the resultant modified conjugated diene-based polymer may optionally be adjusted through addition of, for example, an extender oil. This process can improve the processability of the modified conjugated diene-based polymer. Examples of the extender oil include aromatic oil, naphthenic oil, and paraffinic oil. The amount of the extender oil may be appropriately determined depending on, for example, the type of the monomer used for the polymerization. For example, the amount of the extender oil is 10 to 50 parts by mass relative to 100 parts by mass of the modified conjugated diene-based polymer. The modified conjugated diene-based polymer of the present invention may be a product prepared through partial or complete hydrogenation of the double bonds of the conjugated diene-based polymer after the modification reaction. The hydrogenation reaction may be performed by any known method.

The modified conjugated diene-based polymer has a weight average molecular weight (Mw) (in terms of polystyrene) as measured by means of GPC of preferably $1.0 \times 10^5$ to $2.0 \times 10^6$, more preferably $1.2 \times 10^5$ to $1.5 \times 10^6$, still more preferably $1.5 \times 10^5$ to $1.0 \times 10^6$. The ratio of the weight average molecular weight (Mw) to the number average molecular weight (Mn) (i.e., the molecular weight distribution (Mw/Mn)) is preferably 1.0 to 3.5. A broad molecular weight distribution may lead to an increase in amount of low-molecular-weight component, resulting in impairment of low hysteresis loss properties and wear resistance. The molecular weight distribution (Mw/Mn) is more preferably 1.0 to 3.0, still more preferably 1.0 to 2.5. The aforementioned method involving the use of the cyclic silazane compound (A) as a modifying agent can produce a modified conjugated diene-based polymer exhibiting a sharp molecular weight distribution. The method is preferred for the production of a vulcanized rubber having excellent low hysteresis loss properties.

[2] Polymer Composition and Crosslinked Polymer
(Polymer Component)

The polymer composition of the present invention contains, as a polymer component, the modified conjugated diene-based polymer prepared through reaction between the cyclic silazane compound (A) and the conjugated diene-based polymer having an alkali metal or an alkaline-earth metal at the polymer terminal (hereinafter the modified conjugated diene-based polymer may be referred to as "specific polymer"). The amount of the specific polymer contained in the polymer composition is preferably 20 mass % or more, more preferably 30 mass % or more, still more preferably 40 mass % or more, relative to the entirety of the polymer composition. If the amount of the specific polymer is 20 mass % or more, the resultant crosslinked polymer exhibits further improved mechanical properties (e.g., tensile strength and tensile elongation), crack growth resistance, and wear resistance. In addition, the crosslinked polymer exhibits excellent low fuel consumption performance and wet grip performance.

The polymer composition of the present invention may contain, as a polymer component, an additional polymer other than the aforementioned specific polymer. Examples of the additional polymer include natural rubber, synthetic isoprene rubber, butadiene rubber, modified butadiene rubber, styrene-butadiene rubber, modified styrene-butadiene rubber, ethylene-α-olefin copolymer rubber, ethylene-α-olefin-diene copolymer rubber, acrylonitrile-butadiene copolymer rubber, chloroprene rubber, halogenated butyl rubber, styrene-isoprene copolymer rubber, butadiene-isoprene copolymer rubber, random styrene-butadiene-isoprene copolymer rubber, styrene-acrylonitrile-butadiene copolymer rubber, acrylonitrile-butadiene copolymer rubber, polystyrene-polybutadiene-polystyrene block copolymer, and mixtures thereof.

(Silica)

The polymer composition according to the first embodiment of the invention includes silica as a reinforcing agent. Specific examples of the silica include wet process silica (hydrated silica), dry process silica (silicic anhydride), colloidal silica, precipitated silica, calcium silicate, aluminum silicate, and the like. Among these, wet process silica is particularly preferable from the viewpoint of improving fracture resistance, and achieving wet grip properties and low rolling resistance in combination. It is also preferable to use high dispersible-type silica since the dispersibility of the silica in the polymer composition can be improved while improving properties and processability. These silicas may be used either alone or in combination.

The polymer composition may optionally include carbon black as the reinforcing agent in addition to the silica. The grip performance and the fracture resistance of the resulting crosslinked polymer are improved by utilizing the carbon black. Specific examples of the carbon black include furnace black (e.g., HAF, ISAF, SAF), acetylene black, thermal black, and the like. These carbon blacks may be used either alone or in combination.

The silica and the carbon black are preferably added to the polymer composition in a total amount of 20 to 130 parts by mass, and more preferably 25 to 110 parts by mass, based on 100 parts by mass of the polymer component in total. If the amount of the reinforcing agent is small, fracture resistance and the like may not be sufficiently improved. If the amount of the reinforcing agent is large, the processability of the polymer composition may deteriorate. An advantage similar to that achieved when the silica and the carbon black are used in combination can be obtained by adding a carbon-silica dual-phase filler to the polymer composition according to the first embodiment of the invention.

(Crosslinking Agent)

The polymer composition according to the first embodiment of the invention includes a crosslinking agent (vulcanizing agent). Examples of the crosslinking agent include sulfur, sulfur halides, organic peroxides, quinone dioximes, organic polyamine compounds, methylol group-containing alkylphenol resins, and the like. Sulfur is normally used as the crosslinking agent. Sulfur is preferably used in an amount of 0.1 to 5 parts by mass, and more preferably 0.5 to 3 parts by mass, based on 100 parts by mass of the polymer component (in total) included in the polymer composition.

The polymer composition according to the first embodiment of the invention may optionally include a chemical, an additive, and the like that are normally used in the rubber industry. Examples of such a chemical or an additive include a vulcanization aid, a processing aid, a vulcanization accelerator, silane coupling agent, compatibilizer, a process oil, an antioxidant, an anti-scorching agent, zinc oxide, and the like.

Stearic acid is normally used as the vulcanization aid and the processing aid. The vulcanization aid and the processing aid are normally used in an amount of 0.5 to 5 parts by mass based on 100 parts by mass of the polymer component (in total) included in the polymer composition.

Examples of the vulcanization accelerator include a sulfenamide-based compound, a guanidine-based compound, a thiuram-based compound, a thiourea-based compound, a thiazole-based compound, a dithiocarbamic acid-based compound, and a xanthic acid-based compound. The vulcanization accelerator is normally used in an amount of 0.1 to 5 parts by mass, and preferably 0.4 to 4 parts by mass, based on 100 parts by mass of the polymer component (in total) included in the polymer composition.

Silane coupling agent is preferably used bis(3-triethoxysilylpropyl) polysulfides, 3-trimethoxysilylpropylbenzothiazyl tetrasulfide, and the mercaptosilane compound disclosed in Japanese Patent Application Publication (KOKAI) No. 2006-249069 from the viewpoint of an improvement in reinforcement capability, and the like. The silane coupling agent is preferably used in an amount of 1 to 20 parts by mass, and more preferably 3 to 15 parts by mass, based on 100 parts by mass of the silica included in the polymer composition.

Example of a compatibilizer include organic compounds selected from epoxy group-containing compounds, carboxylic acid compounds, carboxylic ester compounds, ketone compounds, ether compounds, aldehyde compounds, hydroxyl group-containing compounds, and amino group-containing compounds, silicon compounds selected from alkoxysilane compounds, siloxane compounds, and aminosilane compounds, and the like.

The polymer composition according to the first embodiment of the invention may be produced by kneading the polymer component, the silica, the crosslinking agent, and an optional component using a kneader such as an open-type kneader (e.g., roll) or an internal mixer (e.g., Banbury mixer). The polymer composition according to the first embodiment of the invention can be applied to various rubber products as a crosslinked polymer by crosslinking (vulcanizing) the polymer composition after molding. For example, the polymer composition may be applied to a tire (e.g., tire tread, undertread, carcass, sidewall, and bead), other industrial products such as a vibration-proof rubber, a fender, a belt, and a hose, and the like. In particular, the polymer composition may preferably be used as a tire tread rubber from the viewpoint of providing low fuel consumption performance and wet skid resistance.

The tire can be produced by a customary method. For example, if the aforementioned crosslinked polymer is used for a sidewall, the aforementioned polymer composition is mixed by means of a kneader to form a sheet, and the sheet is disposed outside a carcass and vulcanized by a customary method, to thereby form a sidewall rubber. A pneumatic tire is thereby produced.

EXAMPLES

The present invention will next be described in detail by way of examples, which should not be construed as limiting the invention thereto. Unless otherwise specified, the units "part(s)" and "%" described in Examples and Comparative Examples refer to "part(s) by mass" and "mass %," respectively. The physical properties of a polymer are determined as described below.

Bonded styrene content [%]: determined by means of $^1$H-NMR (500 MHz).

Vinyl bond content [mol %]: determined by means of $^1$H-NMR (500 MHz).

Weight average molecular weight (Mw) (in terms of polystyrene): determined from the retention time corresponding to the vertex of the maximum peak of a GPC curve obtained by means of gel permeation chromatography (trade name "HLC-8120GPC," manufactured by Tosoh Corporation) under the following conditions:

Column: trade name "GMHXL" (manufactured by Tosoh Corporation) (×2)
Column temperature: 40° C.
Mobile phase: tetrahydrofuran
Flow rate: 1.0 mL/min
Sample concentration: 10 mg/20 mL Comparative Example 1

<Synthesis of Modified Conjugated Diene-based Polymer PC1>

Cyclohexane (serving as a solvent) (2,150 g), tetrahydrofuran (serving as a randomizer) (0.5 mmol), styrene (serving as a monomer) (135 g), and 1,3-butadiene (serving as a monomer) (355 g) were added to an autoclave reactor (inner volume: 5 L) purged with nitrogen. The temperature of the mixture contained in the reactor was adjusted to 10° C., and then n-butyllithium (n-BuLi) (serving as a polymerization initiator) (4.57 mmol) was added to the reactor for initiation of polymerization. The polymerization was performed under adiabatic conditions, and the maximum temperature reached 90° C. When the polymerization conversion reached 99%, 1,3-butadiene (10 g) was added to the reactor over two minutes, and then 2,2-dimethoxy-1-phenyl-1,2-azasilolidine (compound represented by the following formula (b-1)) (serving as a polymerization terminator (modifying agent)) (4.14 mmol) was added to the reactor. Fifteen minutes thereafter, the reaction was terminated.

Subsequently, 2,6-di-tert-butyl-p-cresol (2.0 g) was added to the resultant polymer solution. The solvent was then removed by means of steam stripping, to thereby yield a modified conjugated diene-based polymer. Thereafter, the resultant polymer was dried by means of a heating roll whose temperature was adjusted to 110° C., to thereby produce a modified conjugated diene-based polymer PC1.

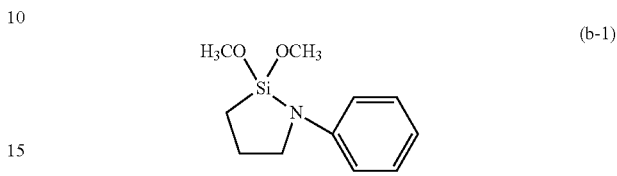

(b-1)

<Production of Polymer Composition and Crosslinked Polymer>

The resultant modified conjugated diene-based polymer PC1 was mixed with other components according to the formulation shown below in Table 1, and the mixture was kneaded to produce a polymer composition. The kneading was performed as follows. In a first kneading step, the modified conjugated diene-based polymer PC1, butadiene rubber, an extender oil, silica, carbon black, a silane coupling agent, stearic acid, an antioxidant, and zinc oxide were mixed and kneaded by means of a plastomill (inner volume: 250 mL) equipped with a temperature controller (charging rate: 72%, rotation speed: 60 rpm). In a second kneading step, the above-kneaded product was cooled to room temperature, and then mixed with sulfur and a vulcanization accelerator, followed by kneading. The resultant product was molded and vulcanized by means of a vulcanizing press at 160° C. for a specific period of time, to thereby produce a crosslinked polymer (vulcanized polymer).

TABLE 1

| Component | | Parts by mass |
|---|---|---|
| Modified conjugated diene-based polymer | | 70 |
| Butadiene rubber | *1 | 30 |
| Extender oil | *2 | 37.5 |
| Silica | *3 | 70 |
| Carbon black | *4 | 5.6 |
| Silane coupling agent | *5 | 5.6 |
| Stearic acid | | 2 |
| Antioxidant | *6 | 1 |
| Zinc oxide | | 3 |
| Vulcanization accelerator D | *7 | 1.5 |
| Vulcanization accelerator CZ | *8 | 1.8 |
| Sulfur | | 1.5 |

The details of each component in Table 1 are shown below.

*1: BR01 manufactured by JSR Corporation, *2: JOMO Process NC-140 manufactured by Japan Energy Corporation, *3: ZEOSIL 1165MP manufactured by Rhodia, *4: DIABLACK N339 manufactured by Mitsubishi Chemical Corporation, *5: Si75 manufactured by Evonik, *6: OZONONE 6C manufactured by Seiko Chemical Co., Ltd., *7: NOCCELER D manufactured by Ouchi Shinko Chemical Industrial Co., Ltd., *8: NOCCELER CZ manufactured by Ouchi Shinko Chemical Industrial Co., Ltd.

Evaluation of Physical Properties

The above-produced crosslinked polymer was evaluated for the following physical properties.

(1) 0° C. tan δ

The 0° C. tan δ of the crosslinked polymer (sample for analysis) was determined by means of ARES-RDA (manufactured by TA Instruments) under the following conditions: shear strain 1.0%, angular velocity: 100 radians/second, temperature: 0° C. The 0° C. tan δ was represented by an index relative to that (taken as 100) of the crosslinked polymer of Comparative Example 1. The indexes of the crosslinked polymers of the Examples were compared as described below for evaluation of 0° C. tan δ. A larger 0° C. tan δ value indicates better wet grip properties.

(2) 50° C. tan δ

The 50° C. tan δ of the crosslinked polymer (sample for analysis) was determined by means of ARES-RDA (manufactured by TA Instruments) under the following conditions: shear strain 1.0%, angular velocity: 100 radians/second, temperature: 50° C. The 50° C. tan δ was represented by an index relative to that (taken as 100) of the crosslinked polymer of Comparative Example 1. The indexes of the crosslinked polymers of the Examples were compared as described below for evaluation of 50° C. tan δ. A larger 50° C. tan δ value indicates a smaller energy loss and better low hysteresis loss properties.

Example 1

<Synthesis and Evaluation of Modified Conjugated Diene-based Polymer P1>

The procedure of Comparative Example 1 was repeated for polymerization, except that the polymerization terminator was replaced with 2-(2,2-dimethoxy-1,2-azasilolidin-1-yl)-N,N-diethylethan-1-amine (compound represented by the following formula (A-1)) (4.14 mmol), to thereby produce a modified conjugated diene-based polymer P1. In the same manner as in Comparative Example 1, a polymer composition and a crosslinked polymer were prepared from the modified conjugated diene-based polymer P1, and the crosslinked polymer was evaluated for the physical properties. The results are illustrated in Table 2 together with the results of determination of the bonded styrene content, vinyl bond content, and weight average molecular weight of the modified conjugated diene-based polymer P1.

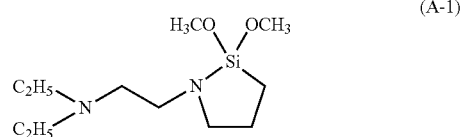

(A-1)

Example 2

<Synthesis and Evaluation of Modified Conjugated Diene-Based Polymer P2>

The procedure of Example 1 was repeated for polymerization, except that piperidine (3.31 mmol) was added to the autoclave reactor together with the solvent, the randomizer, and the monomers, to thereby produce a modified conjugated diene-based polymer P2. In the same manner as in Comparative Example 1, a polymer composition and a crosslinked polymer were prepared from the modified conjugated diene-based polymer P2, and the crosslinked polymer was evaluated for the physical properties. The results are illustrated in Table 2 together with the results of determination of the bonded styrene content, vinyl bond content, and weight average molecular weight of the modified conjugated diene-based polymer P2.

TABLE 2

|  | Example 1 | Example 2 | Comparative Example 1 |
|---|---|---|---|
| Bonded styrene content (wt %) | 27 | 27 | 27 |
| Vinyl bond content (mol %) | 57 | 56 | 55 |
| Weight average molecular weight ($\times 10^4$) | 20 | 20 | 20 |
| 0° C. tanδ (INDEX) | 105 | 111 | 100 |
| 50° C. tanδ (INDEX) | 104 | 112 | 100 |

As is clear from the results illustrated in Table 2, the polymer produced by use of the compound represented by the formula (1) as a polymerization terminator (Example 1 or 2) exhibits favorable wet grip properties and low hysteresis loss properties, as compared with the polymer produced without use of the compound represented by the formula (1) as a polymerization terminator (Comparative Example 1). The results indicate that the method for producing a modified conjugated diene-based polymer by use of the compound represented by the formula (1) causes no generation of a silanol compound during the production process, and produces a crosslinked polymer exhibiting a good balance between low hysteresis loss properties and wet grip properties.

The invention claimed is:

1. A modified conjugated diene-based polymer produced by reacting a conjugated diene-based polymer having an alkali metal or an alkaline-earth metal at a terminal of the polymer with a compound represented by formula (1):

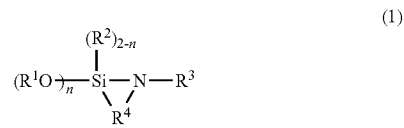

(1)

wherein:
$R^1$ and $R^2$ each independently represent a hydrocarbyl group having 20 or fewer carbon atoms;
$R^3$ represents a substituted alkyl group having 20 or fewer carbon atoms, wherein a hydrogen atom and/or a —$CH_2$— of an alkyl group are substituted by a group comprising at least one heteroatom selected from the group consisting of nitrogen, phosphorus, oxygen, and sulfur, or are substituted by a monovalent aromatic group having 20 or fewer carbon atoms and comprising at least one element selected from the group consisting of nitrogen, phosphorus, oxygen, and sulfur, with the proviso that $R^3$ does not have active hydrogen;
$R^4$ represents an alkanediyl group having 20 or fewer carbon atoms; and
n is 1 or 2.

2. The modified conjugated diene-based polymer according to claim 1, wherein an amount of a structural unit derived from an aromatic vinyl compound is 0 to 50 mass % relative to a total amount of structural units of the conjugated diene-based polymer, and a vinyl bond content is 20 to 90 mol % relative to a total amount of structural units derived from a conjugated diene compound in the conjugated diene-based polymer.

3. The modified conjugated diene-based polymer according to claim 1, wherein the conjugated diene-based polymer has a nitrogen-containing functional group at a polymerization initiation terminal.

4. A method for producing a modified conjugated diene-based polymer, the method comprising reacting a conjugated diene-based polymer having an alkali metal or an alkaline-earth metal at a terminal of the polymer with a compound represented by formula (1):

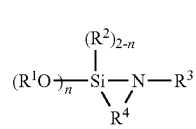

wherein:
R$^1$ and R$^2$ each independently represent a hydrocarbyl group having 20 or fewer carbon atoms;
R$^3$ represents a substituted alkyl group having 20 or fewer carbon atoms, wherein a hydrogen atom and/or a —CH$_2$— of an alkyl group are substituted by a group comprising at least one heteroatom selected from the group consisting of nitrogen, phosphorus, oxygen, and sulfur, or are substituted by a monovalent aromatic group having 20 or fewer carbon atoms and comprising at least one element selected from the group consisting of nitrogen, phosphorus, oxygen, and sulfur, with the proviso that R$^3$ does not have active hydrogen;
R$^4$ represents an alkanediyl group having 20 or fewer carbon atoms; and
n is 1 or 2.

5. A polymer composition comprising:
the modified conjugated diene-based polymer according to claim 1,
silica, and
a crosslinking agent.

6. A crosslinked polymer produced through crosslinking of the polymer composition according to claim 5.

7. A tire, comprising the crosslinked polymer according to claim 6 as a tread material, a sidewall material, or both.

* * * * *